(12) United States Patent
Omori et al.

(10) Patent No.: US 10,063,880 B2
(45) Date of Patent: Aug. 28, 2018

(54) MOTION DETECTING APPARATUS, MOTION DETECTING METHOD AND PROGRAM

(71) Applicant: CANON KABUSHIKI KAISHA, Tokyo (JP)

(72) Inventors: Yuji Omori, Kawasaki (JP); Masato Shima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 380 days.

(21) Appl. No.: 14/565,783

(22) Filed: Dec. 10, 2014

(65) Prior Publication Data

US 2015/0181221 A1 Jun. 25, 2015

(30) Foreign Application Priority Data

Dec. 20, 2013 (JP) ................................. 2013-264324

(51) Int. Cl.
*H04N 19/56* (2014.01)

(52) U.S. Cl.
CPC .................... *H04N 19/56* (2014.11)

(58) Field of Classification Search
CPC .................................................... H04N 19/56
See application file for complete search history.

(56) References Cited

U.S. PATENT DOCUMENTS

| | | | |
|---|---|---|---|
| 5,751,359 A * | 5/1998 | Suzuki | H04N 19/61 375/240.03 |
| 6,483,527 B2 | 11/2002 | Kaneko et al. | |
| 8,891,621 B2 | 11/2014 | Igarashi | |
| 2001/0019586 A1* | 9/2001 | Kang | H04N 5/145 375/240.16 |
| 2001/0026590 A1* | 10/2001 | Kang | H04N 5/145 375/240.16 |
| 2004/0175049 A1* | 9/2004 | Yamamoto | H04N 19/61 382/236 |
| 2004/0223548 A1* | 11/2004 | Kato | H04N 19/172 375/240.16 |
| 2005/0018772 A1* | 1/2005 | Sung | H04N 19/56 375/240.16 |
| 2008/0056365 A1 | 3/2008 | Igarashi | |
| 2009/0190660 A1* | 7/2009 | Kusakabe | H04N 19/139 375/240.13 |

(Continued)

FOREIGN PATENT DOCUMENTS

| | | |
|---|---|---|
| JP | H04-322590 A | 11/1992 |
| JP | 5-49017 A | 2/1993 |

(Continued)

*Primary Examiner* — Peter D Le
(74) *Attorney, Agent, or Firm* — Fitzpatrick, Cella, Harper & Scinto (57) ABSTRACT

In a motion detecting apparatus which can perform a high-accuracy motion search with a less calculation cost, it is discriminated whether or not input Activity and DIFF_XORSUM values are smaller than respective predetermined thresholds. If the Activity value is smaller than the threshold or the DIFF_XORSUM value is smaller than the threshold, a reference vector is selected as a motion vector. On the other hand, if the Activity value is equal to or higher than the threshold and the DIFF_XORSUM value is equal to or higher than the threshold, an N-valued image search vector is selected as the motion vector.

8 Claims, 6 Drawing Sheets

(56) References Cited

U.S. PATENT DOCUMENTS

| | | | |
|---|---|---|---|
| 2010/0208803 A1* | 8/2010 | Matsuo | H04N 19/147 375/240.12 |
| 2011/0026598 A1* | 2/2011 | Takada | H04N 19/56 375/240.16 |
| 2012/0026394 A1* | 2/2012 | Maruyama | H04N 19/14 348/465 |
| 2012/0275521 A1* | 11/2012 | Cui | H04N 5/23254 375/240.16 |

FOREIGN PATENT DOCUMENTS

| | | |
|---|---|---|
| JP | H07-231446 A | 8/1995 |
| JP | H07-274182 A | 10/1995 |
| JP | 2008-61133 A | 3/2008 |
| JP | 2008-124699 A | 5/2008 |
| JP | 2013-131789 A | 7/2013 |

* cited by examiner

FIG. 5

MOTION DETECTING APPARATUS, MOTION DETECTING METHOD AND PROGRAM

BACKGROUND OF THE INVENTION

Field of the Invention

The present invention particularly relates to a motion detecting apparatus which is suitably used to calculate a motion vector in an encoding process, a motion detecting method which is suitably performed by the motion detecting apparatus, and a program which is suitably used to cause a computer to perform the motion detecting method.

Description of the Related Art

In an encoding method such as an H.26x method, an MPEG (Moving Picture Experts Group) method, an HEVC (High Efficiency Video Coding) method or the like, a one frame of a moving image is divided into a plurality of blocks, and encoding is performed per divided block. Incidentally, a compression encoding method includes an encoding method (inter coding) using temporal correlativity and an encoding method (intra coding) using spatial correlativity. More specifically, in the encoding method using the temporal correlativity, encoding is performed by searching an inter-frame motion (movement), and obtaining a motion vector of a target block and a difference between blocks.

In case of performing the inter coding, it is thought to perform a full search to obtain the motion vector having the highest correlativity with high accuracy. However, for example, if a block of eight bits and 16×16 pixels is compared with all of 64×64 pixels corresponding to the search area of a reference frame, eight-bit comparison calculation is necessary by 16×16×64×64=1,048,576 times. That is, if the full search is performed as just described, huge calculation cost is necessary.

Consequently, to reduce the calculation cost, various methods such as a motion searching method using binary images, a motion searching method using N-valued images (N≥2), and the like have been proposed (e.g., Japanese Patent Application Laid-Open No. H05-049017). In the searching method using the binary images, the calculation cost for each pixel can be reduced from eight bits to one bit by using a binary image as an input image. Besides, a method of setting the motion vector detected in the searching method using binary images or N-valued images as the center of search and performing a motion search with a multivalued image to a small searching area has been proposed (e.g., Japanese Patent Application Laid-Open No. 2008-061133). In this method, the calculation cost can be reduced as compared with the case where a full searching area is searched with a multivalued image, by reducing the area to be searched with the multivalued image.

However, in the conventional searching method using the binary image, the search is performed by two bits when the binary image is used as the input image. Therefore, although the calculation cost is low, search accuracy deteriorates. In particular, the search accuracy deteriorates at a flat portion in the image, because of the reason described with reference to FIG. 2.

Figure 2:
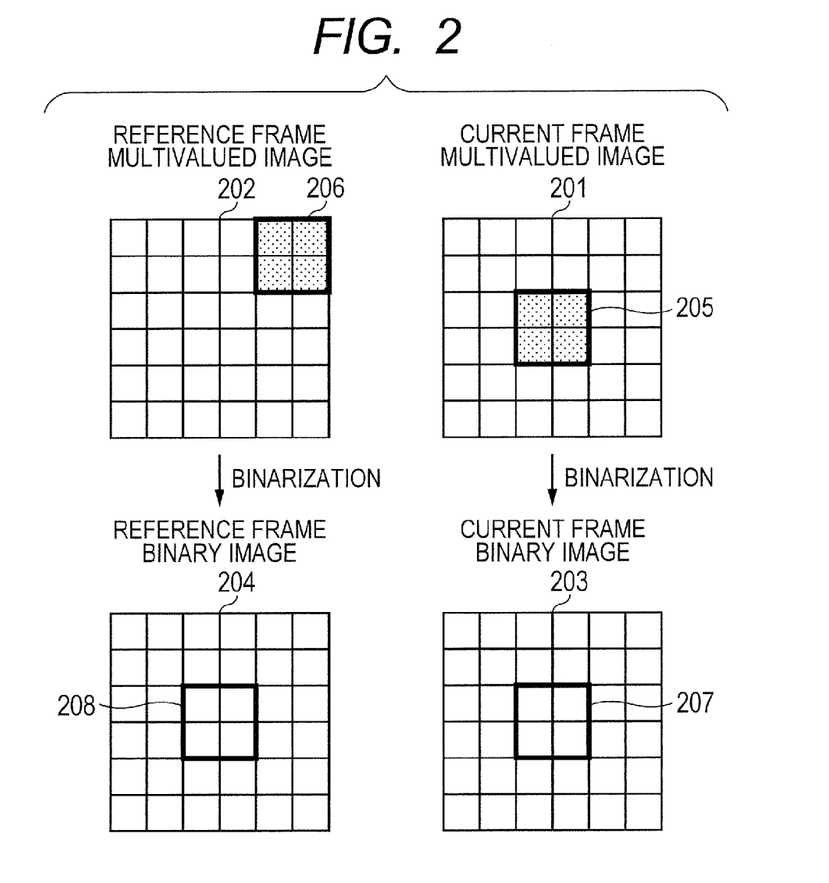
FIG. 2 is a diagram illustrating an example of results obtained by respectively binarizing a current frame multivalued image and a reference frame multivalued image.

FIG. 2 shows that the pixel value of each of a block 205 surrounded by the thick line in a current frame multivalued image 201 and a block 206 surrounded by the thick line in a reference frame multivalued image 202 is different from the pixel values of other blocks. Incidentally, it should be noted that each square in FIG. 2 is equivalent to one pixel. In the example illustrated in FIG. 2, when each of the current frame multivalued image 201 and the reference frame multivalued image 202 is binarized, any change does not occur in the pixel value of each of a current frame binary image 203 and a reference frame binary image 204. This is because the pixel value of each of the current frame multivalued image 201 and the reference frame multivalued image 202 is monotonous. That is, in the case where the current frame multivalued image 201 and the reference frame multivalued image 202 are flat images and thus the pixel values of these images are monotonous, when these images are converted into the binary images, the obtained images are the images having no pixel change.

As for the search of the motion vector, for ease of explanation, it is assumed that the search area of 6×6 pixels is searched in regard to the block of 2×2 pixels. Here, if the block 205 of 2×2 pixels surrounded by the thick line in the current frame multivalued image 201 is assumed as the target block to be searched, for example, block matching is performed between the relevant block and the block 206 of 2×2 pixels surrounded by the thick line in the reference frame multivalued image 202. Besides, a block 207 of 2×2 pixels in the current frame binary image 203 corresponds to the block 205. Therefore, a block 208 of 2×2 pixels surrounded by the thick line in the current frame binary image 204 is subjected to the matching with the block 207.

As described above, in the flat portion, there is a case where the result of the searching method using the multivalued image is different from the result of the searching method using the binary image. In other words, there is a problem that the search accuracy deteriorates in the searching method using the binary image, thereby deteriorating encoding efficiency as a whole.

Moreover, when setting the motion vector detected in the searching method using the binary images or the N-valued images as the center of search and performing the motion search with the multivalued image to the small searching area, although the calculation cost is lower than that when searching the whole search area with the multivalued image, the search accuracy deteriorates. That is, since the search accuracy is low, there is a possibility that the motion vector detected by the searching method using the binary image or the N-valued image is significantly deviated from the motion vector having highest correlativity. Moreover, since the search area of the searching method using the multivalued image is small, if the detected motion vector is significantly deviated from the motion vector having the highest correlativity, it is impossible to approximate it to the motion vector having the highest correlativity in the motion search using the multivalued image, thereby deteriorating the search accuracy.

The present invention has been completed in consideration of such problems as described above, and aims to enable a high-accuracy motion search with low calculation cost.

SUMMARY OF THE INVENTION

A motion detecting apparatus according to the present invention is characterized by comprising: a generating unit configured to generate, from an original image being a frame image of a moving image, an image which has the number of gradations smaller than the number of gradations of the original image, in unit of block; a first motion detecting unit configured to perform motion detection based on the image generated by the generating unit and having the number of gradations smaller than the number of gradations of the original image; a calculating unit configured to calculate a parameter indicating a feature quantity of the original image; and a selecting unit configured to select, based on the parameter calculated by the calculating unit, a detection result of the first motion detecting unit or a reference vector as a motion vector.

According to the present invention, it is possible to enable a high-accuracy motion search with low calculation cost.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Hereinafter, the first embodiment of the present invention will be described.

Figure 1:
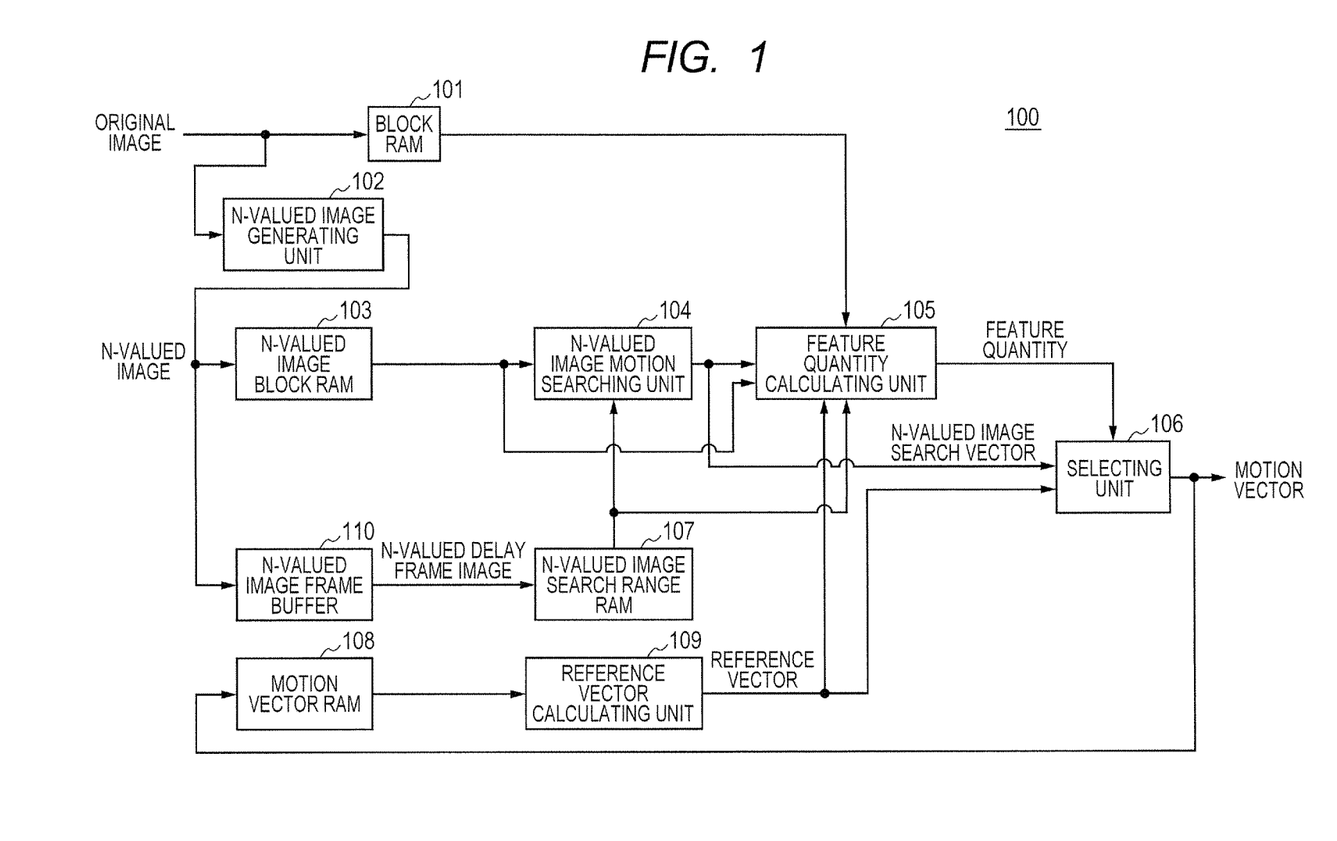
FIG. 1 a block diagram illustrating a constitutional example of a motion searching apparatus according to a first embodiment of the present invention.

FIG. 1 is a block diagram illustrating a constitutional example of a motion searching (detecting) apparatus 100 according to the first embodiment of the present embodiment. Hereinafter, a process to be performed by the motion searching apparatus 100 according to the present embodiment will be described with reference to FIG. 1. In FIG. 1, a block RAM 101 holds an original image which was input in the motion searching apparatus 100. Here, the original image is input with units of blocks composed of a plurality of pixel groups obtained by dividing a frame image, which constitutes a moving image, into rectangular areas.

An N-valued image generating unit 102 generates an N-valued image with a smaller gradation number from the original image which was input. In the present embodiment, the original image is assumed to be an 8-bit image and the N-valued image is assumed to be a binary image. However, it is not limited to this case, and the original image may be a 10-bit or 12-bit image and the N-valued image may be a 4-valued image or 8-valued image. An N-valued image block RAM 103 holds the N-valued image generated by the N-valued image generating unit 102. The N-valued image is input with a unit of block composed of a plurality of pixel groups obtained by dividing a frame image into rectangular areas.

An N-valued image frame buffer 110 holds the N-valued image which was output from the N-valued image generating unit 102. Since the N-valued image which was input is used as a reference frame in the encoding of a subsequent frame, the N-valued image is output as an N-valued delay frame image at least after delaying to the next frame. An N-valued image search range RAM 107 holds an N-valued image reference data group which was set as a search range in the N-valued delay frame image which was output from the N-valued image frame buffer 110.

An N-valued image motion searching unit 104 performs a motion searching process which is based on a block matching process. First, the N-valued image motion searching unit 104 calculates a search range corresponding to a process-target block. Then, N-valued image reference data set as the search range is read out from the N-valued image search range RAM 107. Further, N-valued image data to be processed is read out from the N-valued image block RAM 103.

Next, the N-valued image motion searching unit 104 performs the block matching between the N-valued image data to be processed, which was read out, and the N-valued image reference data. In this process, the matching is performed to the N-valued image reference data within the search range while sequentially shifting blocks of the N-valued image to be processed. Then, an N-valued image search vector binMV is calculated as a detected result on the basis of a position in case of being evaluated as the highest similarity in the matching process to be output to a feature quantity calculating unit 105 and a selecting unit 106.

Here, since the N-valued image is the binary image, a general total amount of an exclusive OR (XORSUM value) among corresponding pixels is used as an index of similarity among N-valued image blocks. The XORSUM value in the binary image is the same as an SAD (Sum of Absolute Difference) in the multivalued image. For example, respective pixel values of the N-valued image (x pixels×y pixels) to be processed are assumed to be Orgbin (0, 0) to Orgbin (x−1, y−1). In addition, respective pixel values of the N-valued image reference data (x pixels×y pixels) corresponding as matching targets are assumed to be Refbin (0, 0) to Refbin (x−1, y−1). The XORSUM values of these pixel values are calculated by the following expression (1).

$$XORSUM = \sum_{i=0, j=0}^{x-1, y-1} (Orgbin(i, j) XOR Refbin(i, j)) \quad (1)$$

Since the exclusive OR becomes "truth" in a case where input values are different from each other, it can be regarded that when the XORSUM value is smaller, a level of similarity is higher and when the XORSUM value is larger, a level of similarity is lower. In the present embodiment, although the XORSUM value is used as the similarity, the present invention is not limited to this case. For example, in the N-valued image, the above-described SAD may be used. In the present embodiment, the N-valued image motion searching unit 104 performs a motion search by a full searching method, which performs the block matching for all candidate points within the search range. However, a searching method may be properly selected in accordance with a processing time, a circuit cost or the like.

The feature quantity calculating unit 105 calculates the feature quantity of a process-target block. Specifically, first, the feature quantity calculating unit 105 reads out the process-target block of an original image from the block RAM 101 and calculates an Activity value as an index value which indicates flatness of an image. For example, respective pixel values of the process-target block (x pixels×y pixels) are assumed to be Org (0, 0) to Org (x−1, y−1), and a pixel average value of the process-target block is assumed to be an Average value. At that time, the Activity value indicating the feature quantity of the process-target block is calculated by the following expression (2).

$$\text{Activity} = \sum_{i=0, j=0}^{x-1, y-1} (\text{ABS}(Org(i, j) - \text{Average})) \quad (2)$$

In addition, the feature quantity calculating unit 105 also calculates the difference between an XORSUM value of a block of which a position is pointed by the N-valued image search vector binMV and an XORSUM value of a block of which a position is pointed by a reference vector output by a reference vector calculating unit 109. Here, in the present embodiment, the reference vector is the predictive vector PMV calculated based on motion vectors of surrounding blocks. In a case where the process-target block is not positioned on an edge of an image, the predictive vector PMV is calculated by taking a center value (median) of a motion vector of each of the blocks respectively positioned on the upper left and the upper right of the process-target block.

Figure 3:
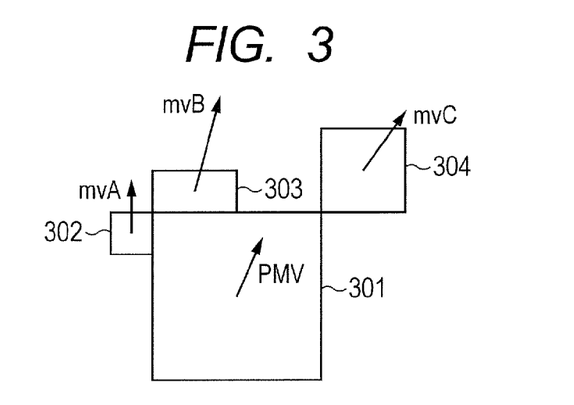
FIG. 3 is a conceptual diagram for describing a predictive vector PMV (Predicted Motion Vector).

FIG. 3 is a conceptual diagram for describing a predictive vector PMV. In FIG. 3, a block 302 is at the left side of a process-target block 301, a block 303 is on the upper side of the process-target block 301 and a block 304 is on the right upper side of the process-target block 301. For example, a motion vector of the block 302 at the left side of the process-target block 301 is assumed to be mvA (x1, y1) and a motion vector of the block 303 on the upper side of the process-target block 301 is assumed to be mvB (x2, y2). And, a motion vector of the block 304 on the right upper side of the process-target block 301 is assumed to be mvC (x3, y3). At this time, the predictive vector PMV (x, y) of the process-target block 301 is calculated by the following expressions (3) and (4).

$$PMV(x) = \text{median}(x1, x2, x3) \quad (3)$$

$$PMV(y) = \text{median}(Y1, y2, y3) \quad (4)$$

As a specific procedure, the feature quantity calculating unit 105 first reads out block data of an N-valued image to be processed from the N-valued image block RAM 103 and reads out N-valued image reference data from the N-valued image search range RAM 107. Then, the feature quantity calculating unit 105 calculates a MIN_XORSUM value which is the XORSUM value of a block of which a position is pointed by the N-valued image search vector binMV calculated at the N-valued image motion searching unit 104. Since this MIN_XORSUM value is calculated also at the N-valued image motion searching unit 104, information thereof may be directly output to the feature quantity calculating unit 105 from the N-valued image motion searching unit 104.

Next, the feature quantity calculating unit 105 calculates a STDMV_XORSUM value which is the XORSUM value of a block of which a position is pointed by the reference vector. Then, the difference, which is a DIFF_XORSUM value, between the XORSUM value of the block of which the position is pointed by the N-valued image search vector binMV and the XORSUM value of the block of which the position is pointed by the reference vector is calculated by the following expression (5).

$$\text{DIFF\_XORSUM} = \text{STDMV\_XORSUM} - \text{MIN\_XORSUM} \quad (5)$$

The feature quantity calculating unit 105 outputs the Activity value and the DIFF_XORSUM value calculated as described above to the selecting unit 106.

The selecting unit 106 determines a final motion vector from either the N-valued image search vector or the reference vector on the basis of the Activity value and the DIFF_XORSUM value which were input. First, the selecting unit 106 discriminates whether or not the Activity value and the DIFF_XORSUM value are smaller than respective predetermined thresholds. When the Activity value or the DIFF_XORSUM value is smaller than the threshold, the reference vector is selected as a motion vector. On the other hand, when the Activity value and the DIFF_XORSUM value are larger than or equal to the threshold, the N-valued image search vector is selected as the motion vector.

In the present embodiment, the respective thresholds to be compared with the Activity value and the DIFF_XORSUM value are assumed to be predetermined. However, it is not limited to this case, but the thresholds may be externally supplied to the motion searching apparatus 100. Further, in the present invention, the motion vector is determined by using the Activity value and the DIFF_XORSUM value. However, it is not limited to this case, but the motion vector may be determined by using only the Activity value or may be determined by using only the DIFF_XORSUM value. Also, a luminance average value or a color difference average value of blocks may be used in case of determining the motion vector. Further, in the present embodiment, when the Activity value is smaller than the threshold or the DIFF_XORSUM value is smaller than the threshold, the reference vector is assumed to be selected. However, it is not limited to this case. For example, it may be constituted that the reference vector is selected when the Activity value is smaller than the threshold and the DIFF_XORSUM value is smaller than the threshold.

A motion vector RAM 108 holds the motion vector which was output by the selecting unit 106. The reference vector calculating unit 109 reads out motion vectors of periphery blocks of a process-target block from the motion vector RAM 108, and the predictive vector PMV, which is the reference vector, is calculated. The calculated reference vector is output to the feature quantity calculating unit 105 and the selecting unit 106. In the present embodiment, the reference vector was assumed to be the predictive vector PMV. However, it is not limited to this case. For example, the reference vector may be set as a zero vector (MV=(0, 0)).

As described above, according to the present embodiment, the N-valued image search vector is to be selected as a motion vector in a case where the Activity value and the DIFF_XORSUM value are equal to or larger than the predetermined values. In this manner, in a case where accuracy of motion search using the N-valued image is in a low level, search accuracy can be improved by replacing the motion vector with the reference vector. In an encoding method such as an H.26x, an MPEG, an HEVC or the like, since the difference between the motion vector and the reference vector is encoded, the code amount also can be reduced by replacing the motion vector with the reference vector.

Second Embodiment

Figure 4:
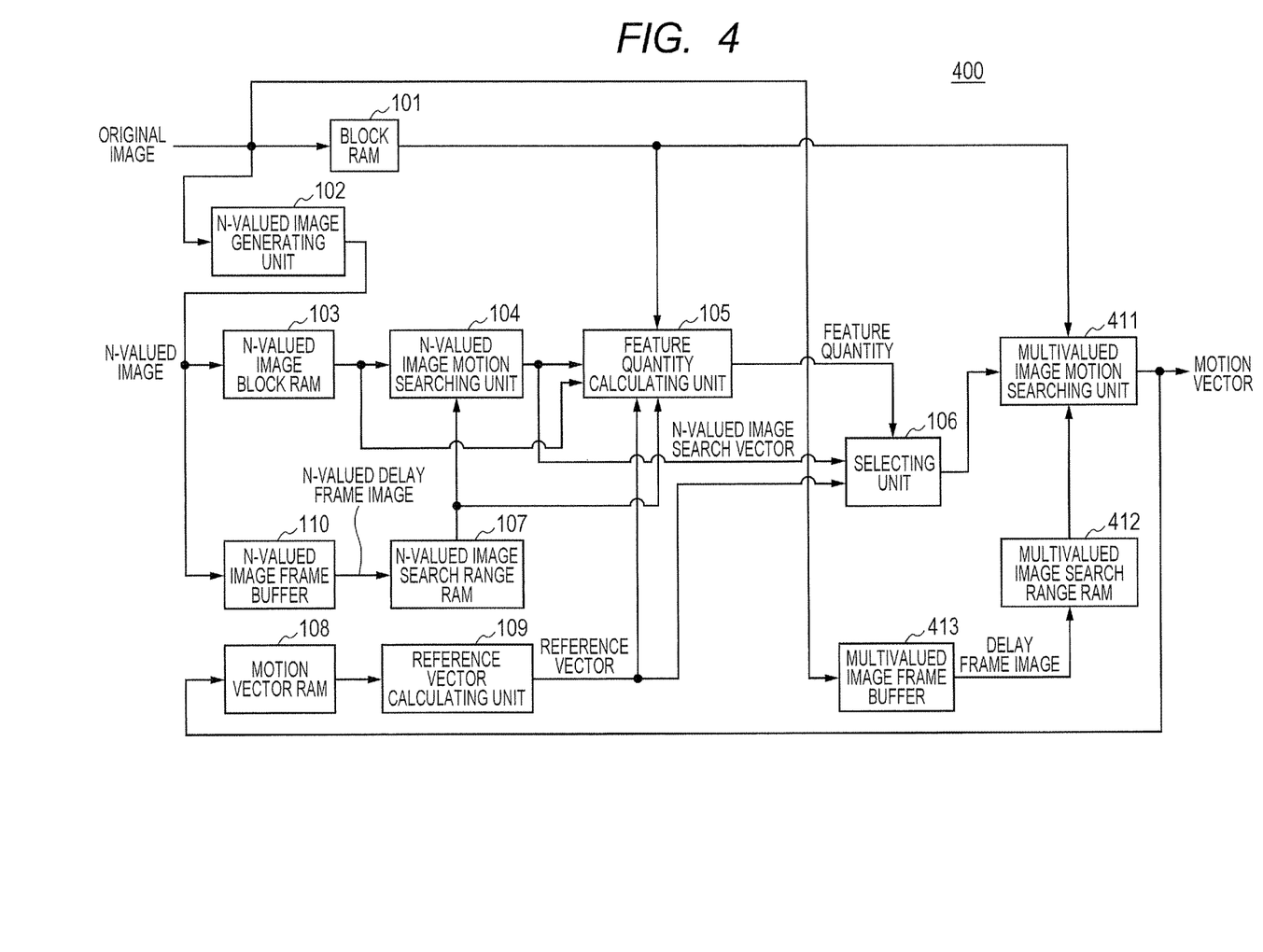
FIG. 4 a block diagram illustrating a constitutional example of a motion searching apparatus according to a second embodiment of the present invention.

Hereinafter, the second embodiment of the present invention will be described with reference to the attached drawings. FIG. 4 a block diagram illustrating a constitutional example of a motion searching apparatus 400 according to the present embodiment. Incidentally, since the constitution having the same reference numerals as those in FIG. 1 is similar to that of the first embodiment, the description thereof will be omitted. Hereinafter, points different from a case of the first embodiment will be described.

In FIG. 4, a multivalued image motion searching unit 411 performs the motion search of using a multivalued image by treating the motion vector which was output by the selecting unit 106 as a reference position. In order to hold an original image with units of blocks and use the original image as a reference frame in the encoding of the subsequent frame, a multivalued image frame buffer 413 outputs the original image as a delay frame image after delaying at least to the next frame. A multivalued image search range RAM 412 stores a delay frame image set as a search range as a multivalued image reference data group among delay frame images which were output from the multivalued image frame buffer 413.

The multivalued image motion searching unit 411 first calculates a search range corresponding to a process-target block, then reads out multivalued image reference data set as the search range from the multivalued image search range RAM 412 and reads out data of an original image to be processed from a block RAM 101. Next, the multivalued image motion searching unit 411 performs the block matching between the data of the original image to be processed, which was read out, and the multivalued image reference data. In this process, the matching is performed to the multivalued image reference data within the search range while sequentially shifting blocks of the original image to be processed. Then, a search vector MV is calculated as a motion vector on the basis of a position in case of evaluated as the highest similarity.

Figure 5:
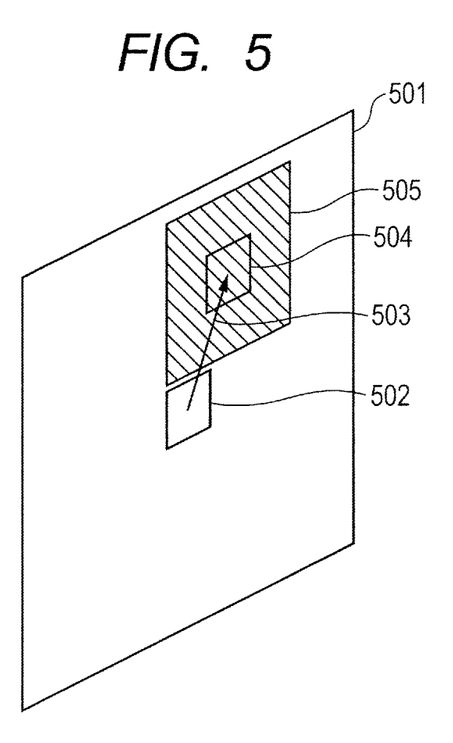
FIG. 5 is a diagram for describing a range where the motion search is performed.

Here, the search range will be described with reference to FIG. 5. The multivalued image motion searching unit 411 performs the motion search by treating a block 504 pointed by a motion vector 503 as a reference position without treating a target block 502 as a reference point. At this time, as for the search range, a full search is performed for a search range 505 smaller than a search range 501.

As described above, according to the present embodiment, in a case where accuracy of motion search of an N-valued image is in a low level, a reference vector is replaced with a motion vector, and the motion search of a multivalued image is to be performed within a smaller range by treating that motion vector as the reference. Accordingly, search accuracy can be more improved.

Third Embodiment

Figure 6:
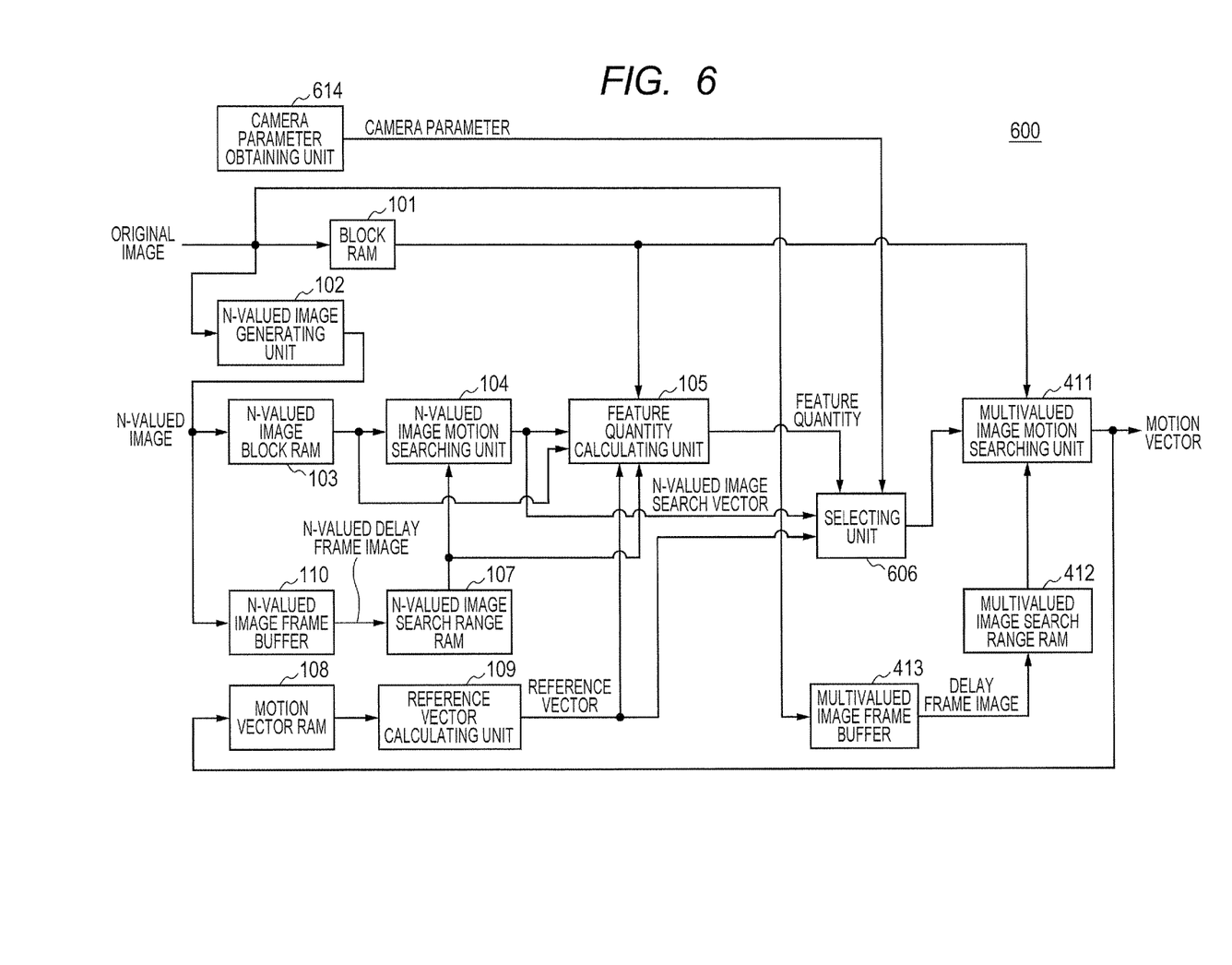
FIG. 6 a block diagram illustrating a constitutional example of a motion searching apparatus according to a third embodiment of the present invention.

Hereinafter, the third embodiment of the present invention will be described with reference to the attached drawings. FIG. 6 is a block diagram illustrating a constitutional example of a motion searching apparatus 600 according to the present embodiment. In FIG. 6, as to the constitution which is the same as that in FIG. 4, since blocks are the same as the corresponding blocks in FIG. 4 respectively, the description thereof will be omitted. Hereinafter, points different from a case of the second embodiment will be described.

A camera parameter obtaining unit 614 detects a state that the motion searching apparatus 600 itself moves or stands still by a motion sensor and obtains information thereof (camera parameter). Then, the obtained camera parameter is output to a selecting unit 606. That is, a state that an imaging unit (not illustrated), which imaged an original image, moves or stands still is to be detected.

A selecting unit 606 selects a binary image search vector or a reference vector on the basis of the feature quantity (Activity value and DIFF_XORSUM value) and the camera parameter. Here, an operation of the selecting unit 606 will be described with reference to FIG. 7.

Figure 7:
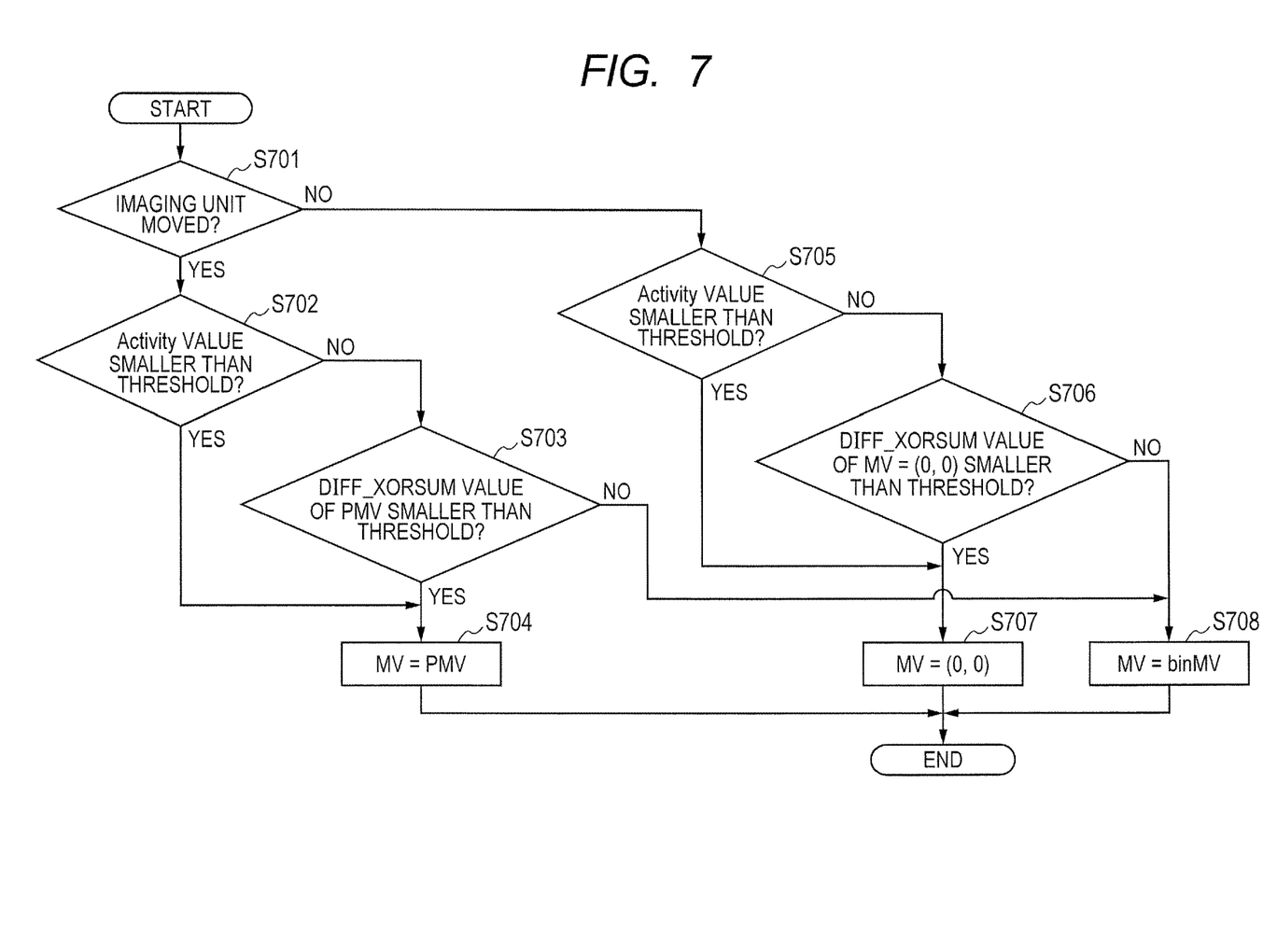
FIG. 7 is a flow chart indicating an example of a processing procedure of selecting a motion vector in the third embodiment of the present invention.

FIG. 7 is a flow chart indicating an example of a processing procedure of selecting a motion vector by the selecting unit 606. First, in a step S701, it is discriminated whether or not the imaging unit (not illustrated) moves by the camera parameter. As a result of this discrimination, when the imaging unit moves, a flow advances to a step S702, and when the imaging unit stands still, a flow advances to a step S705.

Next, in the step S702, it is discriminated whether or not the Activity value is smaller than the threshold. As a result of this discrimination, when the Activity value is smaller than the threshold, a flow advances to a step S704, and the predictive vector PMV is selected as a motion vector. On the other hand, when the Activity value is larger than or equal to the threshold, a flow advances to a step S703. Then, in the step S703, it is discriminated whether or not the DIFF_XORSUM value is smaller than the threshold when the reference vector is assumed to be the predictive vector PMV. As a result of this discrimination, when the DIFF_XORSUM value is smaller than the threshold, a flow advances to the step S704, and when the DIFF_XORSUM value is larger than or equal to the threshold, a flow advances to a step S708. In the step S708, the N-valued image search vector binMV is selected as the motion vector.

On the other hand, in the step S705, it is discriminated whether or not the Activity value is smaller than the threshold. As a result of this discrimination, when the Activity value is smaller than the threshold, a flow advances to a step S707, and a zero vector (MV=(0, 0)) is selected as the motion vector. On the other hand, when the Activity value is larger than or equal to the threshold, a flow advances to a step S706. Then, in the step S706, it is discriminated whether or not the DIFF_XORSUM value is smaller than the threshold when the reference vector is assumed to be the zero vector. As a result of this discrimination, when the DIFF_XORSUM value is smaller than the threshold, a flow advances to the step S707, and when the DIFF_XORSUM value is larger than or equal to the threshold, a flow advances to the step S708.

As described above, when the imaging unit moves, the predictive vector PMV is adopted as the reference vector, and when the imaging unit does not move, the zero vector is adopted as the reference vector. In the present embodiment, although information indicating that the imaging unit moves or stands still is used as the camera parameter, an exposure parameter, an imaging mode of camera or the like may be used.

As described above, according to the present embodiment, in a case where the imaging unit moves and accuracy of the N-valued image motion search is in a low level, the motion vector is replaced with the predictive vector PMV as the reference vector. On the other hand, in a case where the imaging unit does not move and accuracy of the N-valued image motion search is in a low level, the motion vector is replaced with the zero vector as the reference vector. In addition, search accuracy can be more improved by performing the motion search of using a multivalued image in a small range by treating the motion vector as the reference. Especially, when an imaging unit does not move, since there is a high possibility of not finding the motion in a large part in a frame, the code amount can be reduced by replacing the motion vector with the zero vector.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-264324, filed Dec. 20, 2013, which is hereby incorporated by reference herein in its entirety.

What is claimed is:

1. A motion detecting apparatus comprising:
a generating unit configured to generate an image which has a number of gradations less than that of an original image of a moving image, wherein the original image has units of blocks;
a first motion detecting unit configured to perform motion detection of a target block to detect a motion vector, wherein the motion detection is based on the generated image having the number of gradations less than that of the original image;
a calculating unit configured to calculate a flatness value indicating a flatness of the target block, wherein the calculating unit calculates the flatness value using a difference value between (1) an average value of pixel values of the target block in the original image and (2) a pixel value of the target block in the original image; and
a selecting unit configured to select, as a motion vector for the target block, (1) a motion vector detected by the motion detection of the target block based on the generated image or (2) a reference motion vector,
wherein the selecting unit selects the motion vector detected by the motion detection for the target block based on the generated image as the motion vector for the target block, if the flatness value is not smaller than a first threshold,
wherein the selecting unit selects the reference motion vector as the motion vector for the target block, if the flatness value is smaller than the first threshold,
wherein the reference motion vector is (a) a zero motion vector or (b) a motion vector based on a motion vector of a block neighboring the target block, and
wherein the reference motion vector is a vector independent from the motion detection of the target block based on the generated image.

2. The motion detecting apparatus according to claim 1, wherein the reference motion vector is a motion vector which is based on motion vectors of blocks neighboring the target block.

3. The motion detecting apparatus according to claim 1, wherein the selecting unit performs the selection based on (a) the flatness value indicating the flatness of the target block, and (b) a difference between a first sum of absolute differences and a second sum of absolute differences,
wherein the first sum of absolute differences is a sum of absolute differences of a block of which a position is pointed by the motion vector based on the detection result, and
wherein the second sum of absolute differences is a sum of absolute differences of a block of which a position is pointed by the reference motion vector.

4. The motion detecting apparatus according to claim 3, wherein the selecting unit selects, as the motion vector for the target block, the motion vector detected by the motion detection of the target block based on the generated image, in a case where the flatness value is not smaller than the first threshold and the difference between the first sum of absolute differences and the second sum of absolute differences is equal to or larger than a second threshold.

5. The motion detecting apparatus according to claim 3, further comprising an obtaining unit configured to obtain information indicating movement of an imaging unit which imaged the original image,
wherein the selecting unit selects, as the motion vector for the target block, the motion vector detected by the motion detection of the target block based on the generated image or the reference motion vector, further based on the information indicating the movement of the imaging unit obtained by the obtaining unit.

6. The motion detecting apparatus according to claim 1, further comprising a second motion detecting unit configured to perform motion detection based on the original image on the basis of the motion vector selected by the selecting unit.

7. A motion detecting method comprising:
generating an image which has a number of gradations less than that of an original image of a moving image, wherein the original image has units of blocks;
performing motion detection of a target block to detect a motion vector, wherein the motion detection is based on the generated image having the number of gradations less than that of the original image;

calculating a flatness value indicating a flatness of the target block, wherein the calculating calculates the flatness value using a difference value between (1) an average value of pixel values of the target block in the original image and (2) a pixel value of the target block in the original image; and selecting, as a motion vector for a target block, (1) a motion vector detected by the motion detection of the target block based on the generated image or (2) a reference motion vector, wherein the selecting selects the motion vector detected by the motion detection for the target block based on the generated image as the motion vector for the target block, if the flatness value is not smaller than a first threshold, wherein the selecting selects the reference motion vector as the motion vector for the target block, if the flatness value is smaller than the first threshold, wherein the reference motion vector is (a) a zero motion vector or (b) a motion vector based on a motion vector of a block neighboring the target block, and wherein the reference motion vector is a vector independent from the motion detection of the target block based on the generated image.

8. A non-transitory computer-readable storage medium which stores a program characterized by causing a computer to perform steps comprising:

a generating step of generating an image which has a number of gradations less than that of an original image of a moving image, wherein the original image has units of blocks;

a first motion detecting step of performing motion detection of a target block to detect a motion vector, wherein the motion detection is based on the generated image having the number of gradations less than that of the original image;

a calculating step of calculating a flatness value indicating a flatness of the target block, wherein the calculating step calculates the flatness value using a difference value between (1) an average value of pixel values of the target block in the original image and (2) a pixel value of the target block in the original image; and a selecting step of selecting, as a motion vector for the target block, (1) a motion vector detected by the motion detection of the target block based on the generated image or (2) a reference motion vector, wherein the selecting step selects the motion vector detected by the motion detection for the target block based on the generated image as the motion vector for the target block, if the flatness value is not smaller than a first threshold, wherein the selecting step selects the reference motion vector as the motion vector for the target block, if the flatness value is smaller than the first threshold, wherein the reference motion vector is (a) a zero motion vector or (b) a motion vector based on a motion vector of a block neighboring the target block, and wherein the reference motion vector is a vector independent from the motion detection of the target block based on the generated image.

\* \* \* \* \*